United States Patent [19]
Benisti

[11] Patent Number: 4,664,166
[45] Date of Patent: May 12, 1987

[54] NON SLIP SYSTEM FOR A DEFORMABLE DRIVING BAND

[76] Inventor: Julien Benisti, 49,rue Youri Gagarine, 92700 Colombes, France

[21] Appl. No.: 597,070
[22] PCT Filed: Jul. 12, 1983
[86] PCT No.: PCT/FR83/00144
§ 371 Date: Mar. 12, 1984
§ 102(e) Date: Mar. 12, 1984
[87] PCT Pub. No.: WO84/00329
PCT Pub. Date: Feb. 2, 1984

[30] Foreign Application Priority Data

Jul. 16, 1982 [FR] France .................. 83 12521
Nov. 24, 1982 [FR] France .................. 82 19680
Mar. 25, 1983 [FR] France .................. 83 05003

[51] Int. Cl.⁴ .................. B60C 5/00; B60C 5/11; B60C 5/12
[52] U.S. Cl. .................. 152/159; 152/165; 152/166; 152/209 R; 152/209 B; 152/339.1; 152/510; 152/511; 156/96; 198/689.1
[58] Field of Search .................. 152/209 R, 208, 209 D, 152/209 B, 157, 333, 330 R, 450, 331.1, 333.1, 339.1, 340.1, 310–311, 510–512, 159, 165, 166; 156/96, 95; 198/689; D12/140, 146, 148

[56] References Cited

U.S. PATENT DOCUMENTS

D. 269,336 6/1983 Yurkovich .................. D12/146
D. 273,856 5/1984 Vögler .................. D12/146
D. 278,618 4/1985 Kojima et al. .................. D12/140
1,411,671 4/1922 Schrank .................. 152/209 R X
4,303,115 12/1981 Flechtner .................. 152/209 R

FOREIGN PATENT DOCUMENTS 1463604 11/1966 France .
A2044191 10/1980 United Kingdom .

Primary Examiner—Donald E. Czaja
Assistant Examiner—Thomas Bokan
Attorney, Agent, or Firm—Larson and Taylor

[57] ABSTRACT

The deformable driving band (3) or similar comprises passage means (2) passing through the band and opening out, towards the inside, at right angles to pockets (5) or similar provided in a compressible strip (6) extending over the whole driving band, the assembly being such that a suction phenomenon increasing grip is created by the compressible strip (6) and the packets (5) in deformation zone of the driving band (3) corresponding to an expansion phase of said pockets (5).

13 Claims, 18 Drawing Figures

NON SLIP SYSTEM FOR A DEFORMABLE DRIVING BAND

The invention relates to a non slip system for a deformable driving band or similar.

Such a driving band may be formed by the running strip of a pneumatic tire for a vehicle of any type, more especially a light, utility or heavy vehicle. In another application, such a driving band may be formed by an endless transporter belt.

The aim of the invention is especially to improve the grip of the deformable driving band at the surface of the objects with which it comes into contact. Thus, in the case of vehicle tires, the air of the invention is to improve the grip of the tires on the ground, more especially in the case of rain, snow or ice; in the case of a transporter belt, the air of the invenion is to improve the grip of said transporter belt with the material or with the objects to be transported.

According to the invention, a non slip system for a deformable driving band or similar is characterized by the fact that it comprises passage means for passing through the driving band and emerging inwardly at right angles to pockets or similar provided in a compressible strip extending along the whole of the driving band, the assembly being such that a suction phenomenon increasing the grip is created by the compressible strip and the pockets in a deformation zone of the driving band corresponding to an expansion phase of said pockets.

The strip of compressible material may be formed by a part of the driving band itself; each passage means and the pocket (or similar which is associated therewith then form a blind channel slanting with respect to the direction perpendicular to the bearing surface, more especially so that there is progressive ejection of the air from the channel, before the outer end of the channel comes into contact with the bearing surface, this ejection phase being followed by a suction phase.

The slant of each channel may be provided so that, for the normal direction of travel of the driving band with respect to the bearing surface, the outer end of the channel only comes into contact with the bearing surface after the channel has cleared the beginning of the contact zone with this bearing surface.

Each blind channel is entirely located in the driving band which in a way plays also the role of the compressible strip, as pointed out above, this driving band undergoing first of all crushing in the deformation zone, which causes air to be ejected from the channel.

In the case of a pneumatic tire, each blind channel is located entirely in the running strip which is situated radially on the outside of the casing.

In a variant, each passage means and the pocket (or similar) which is associated therewith are formed by the combination of a blind channel slanting with respect to the direction perpendicular to the bearing surface and means for facilitating detachment of the channel.

These means for facilitating detachment of the channel may be formed by an auxiliary channel, with reduced cross section, situated in front of the main channel in the travel direction of the driving band with respect to the bearing surface, this auxiliary channel communicating at least with a zone of the main channel situated towards the blind end of this main channel. This auxiliary channel may be formed by a groove extending over the whole length of the main channel.

According to another possibility, the means for facilitating detachment of the blind channel may be formed by providing the channel in two parts, in particular two half channels with their concave sides turned towards each other provide in two blocks of material separated by a slit of zero width, these blocks being jointing during crushing of the driving belt and moving slightly away from each other during the decompression phase of the band, which causes detachment of the channel.

According to another aspect of the invention, the blind channels may be orientated in the left and/or right transverse direction so as to provide better grip laterally in bends in the road. The channels may be orientated in a direction having a component in the transverse direction and in the longitudinal direction.

The lateral as also the longitudinal tread of the running strip may be slanting through the same angle as that of the blind channels, particularly so as to facilitate removal from the mold.

The invention also relates to pneumatic tyres for vehicles, transporter belts and, more generally, deformable driving band or similar equipped with the non slip system in accordance with the invention.

The invention will be better understood from the detailed description of particular embodiments described with reference to the accompanying drawings but which are in no wise limiting.

BRIEF DESCRIPTION OF THE DRAWINGS

Referring to FIG. 1, there is shown a pneumatic tire 1 equipped with the system for improving the grip thereof. This system comprises passing means formed by radially orientated holes 2 passing through the running strip 3 as well as the casing 4 and opening inwardly of the casing of the tire, at right angles to pockets 5 or similar provided in a strip 6 formed from a compressible material.

Figure 3:
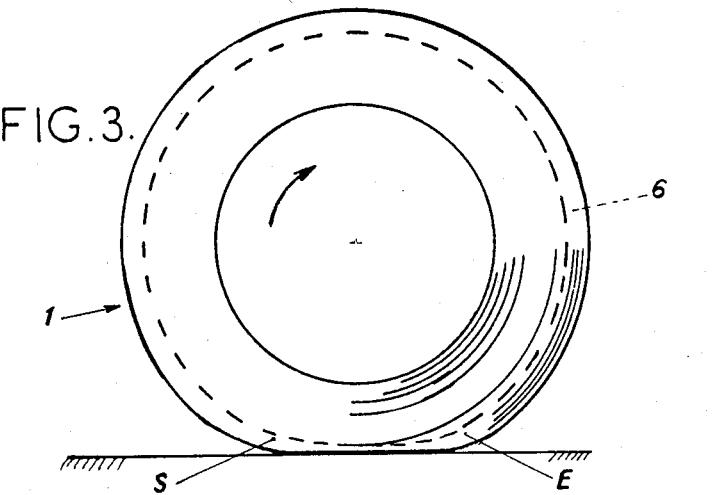
FIG. 3 is a schematical elevational view of the pneumatic tire.

This strip 6, as shown in FIG. 3, extends along the whole inner periphery of the casing 4 and forms a closed ring.

Figure 2:
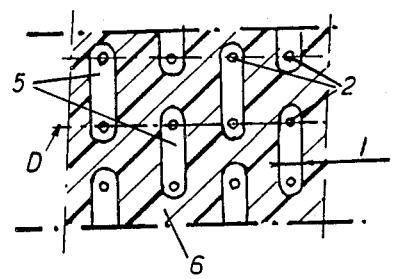
FIG. 2 is a partial section through II—II of FIG. 1.

Pockets 5, as shown in FIG. 2, may have any shape, for example an oblong elongate shape. Several rings of pockets 5 are provided cross the width of the cross section; as shown in FIG. 2, the pockets 5 of a ring are staggered in quincunx arrangement with respect to the pockets 5 of the directly adjacent rings so as to allow permanent contact with the road, one row of pockets taking over from another row in the rotational movement. Holes 2 open out advantageously at longitudinal ends of pockets 5. Holes 2, as shown in FIG. 2, are preferably disposed so that their centers are aligned along straight lines D situated in planes passing through the axis of rotation of the tire. Holes 2 may be in a straight line, a broken line, a conical line or follow another curve.

Flexible wall 7 is sealingly fixed more especially by bonding, to the inside of casing 4 so that strip 6 is imprisoned between this flexible wall 7 and the casing. The pneumatic tire may be of the inner tube type, in which case the inner tube is applied against wall 7 or of the tubeless type or of the solid type.

Strip 6 may be in the form of a solid strip made from an elastomer material or any appropriate material.

In a variant, this strip 6 may be in the form of a sealed annular chamber, with valve, containing a gas, more especially air, under an adjustable pressure counterbalancing that of the tire, or even varying as a function of the load of the vehicle.

The whole is such that in zone E (FIG. 3) of the tire which comes into contact with the ground and which is crushed under the effect of the load supported by the tire, the compression of strip 6 and of the pockets causes the air contained in these pockets to be expelled through holes 2. In zone S (FIG. 3) of the tire which leaves the ground, the strip is progressively relieved of the load and pockets 5 resume their volume by sucking in air through holes 2.

A suction cup phenomenon is thus created by aspiration which increases the grip of the tire on the ground.

Figure 4A:
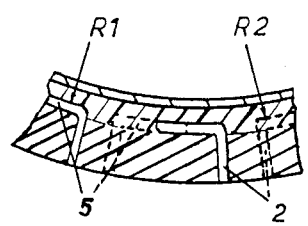
FIG. 4a is a partial section through IV—IV of FIG. 4.
Figure 4:
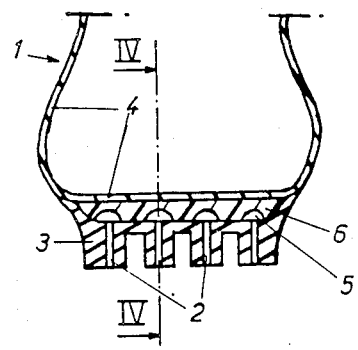
FIG. 4 illustrates, in a schematical partial cross section another embodiment.

In the variant shown in FIG. 4, the compressible strip system 6 with pockets 5 may be placed radially outside the casing 4. This casing does not then have holes 2 passing therethrough. This latter variant may be more particularly suitable for worn tires which are intended to be retreaded; strip 6 with pockets 5 may be inserted during retreading between the casing and the added running strip provided with holes 2.

If need be, strip 6 and strip 3 may form one and the same strip, pockets 5 being provided in a region of strip 3 serving as strip 6.

As shown in FIG. 4a, pockets 5 extend in the peripheral direction, substantially at right angles with respect to the radial direction. In the embodiments shown in FIGS. 4 and 4a, a single radial hole 2 is provided at a longitudinal end of a pocket 5. So as to avoid having to fit the tire in a given direction, pockets 5 are divided into two alternating series R1, R2 orientated in opposite directions. Whatever the direction of rotation of the tire, for one of the series, pockets 5 forming blind channels are situated in front of the associated hole 2.

The crushing phenomenon of the tire against the ground and so the suction cup phenomenon described above is accentuated during a load transfer, for example during braking or in a bend, which contributes to improving the grip on a wet, icy, or snow bound road; in this case, the perforations form additional gripping means which increase the grip on the ground particularly during braking.

This system may be used for any vehicle, whether the tire is made from an elastomer material or from a plastic material or from another material.

Figure 1:
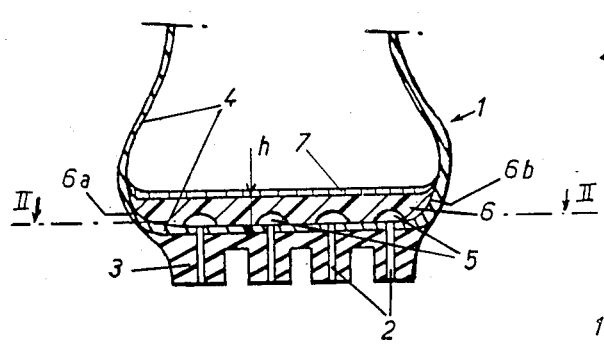
FIG. 1 of these drawings is a schematical cross section of a pneumatic tire equipped with a system in accordance with the invention.

The connection between strip 6 and walls 7 (FIG. 1) may be provided by an assembly of circumferential grooves and ribs provided respectively on the faces of the strip and of the wall which come into contact.

The improvement of the grip is obtained in the case of rain, snow, or ice, also on a normal road as well as during braking on all roads.

The number of rows of pockets, the shape of these pockets as well as the arrangement and the shape of holes 2 are chosen depending on the type of tire so as to obtain the most satisfactory results. In this application to pneumatic tires, the width 1 of each pocket may be several millimeters. The thickness h in the radial direction of strip 6 could be of the order of 10 mm, where as the thickness of wall 7 could be of the order of 2 to 10 mm.

Edges 6a, 6b of strip 6 are preferably bevelled so as to match the contour of the cross section of the tire.

This system may be applied to pneumatic tires of all types, including tires for aircraft under-carriages.

With a pneumatic tire equipped, with this system, a smooth road surface is no longer a disadvantage. This system opposes the "aquaplaning" phenomenon. On a snow bound road, the passage means which comprise orifices opening into the running strip play the role of additional gripping means.

When the compressor strip 6 is in the form of a closed and sealed annular chamber containing a pressurized gas, the vehicle then rests on two air cushions, whence improved comfort; the system further offers greater safety by reducing the risks of the inner tube properly speaking bursting in most cases.

More generally, the invention applies to a deformable driving band or similar.

In the case of an endless transporter belt, the transporter belt passes over rollers at both ends and is wound through a half circle. In the winding zone of the transporter belt, we find again deformations similar to those of zones E and S of the pneumatic tire.

In the region where the transporter belt leaves a roller, the pockets 5 of a compressible strip 6 fixed on the inner surface of the transporter belt will be in an expansion phase with creation of a suction phenomenon through the passage mean formed by holes 2 passing through the transporter belt. By placing the object to be transported in contact with the transporter belt in this zone where a suction phenomenon occurs, said objects may be subjected to a suction cup effect apply them against the belt; this suction cup effect may be maintained during the whole time that the object is transported by the belt, if a sufficient seal is provided between the surface of the object and orifices 2.

The dimensions, the shape and the number of pockets 6 and of orifices 2 are determined as a function of the transporter belt to be equipped with the system of the invention.

The transporter belt, which then forms the deformable driving belt 3, is generally made from an elastomer material and a compressible strip 6 is fixed against this strip, in a way similar to that shown in FIG. 4.

FIGS. 5 to 9 relate to another embodiment.

Figure 5:
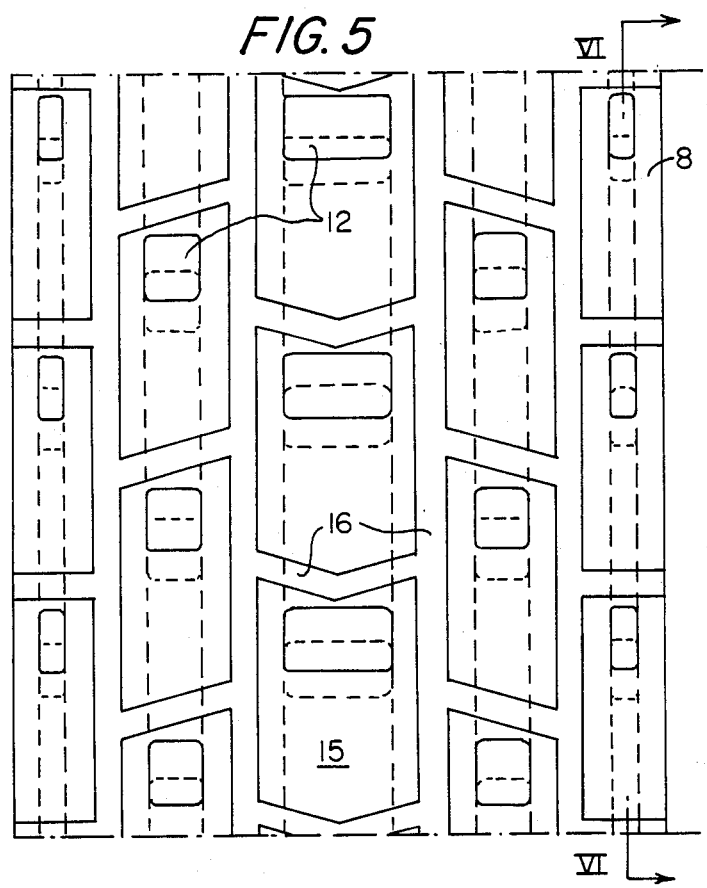
FIG. 5 is an elevational view of the running strip of a pneumatic tire having the non slip system according to the invention.
Figure 6:
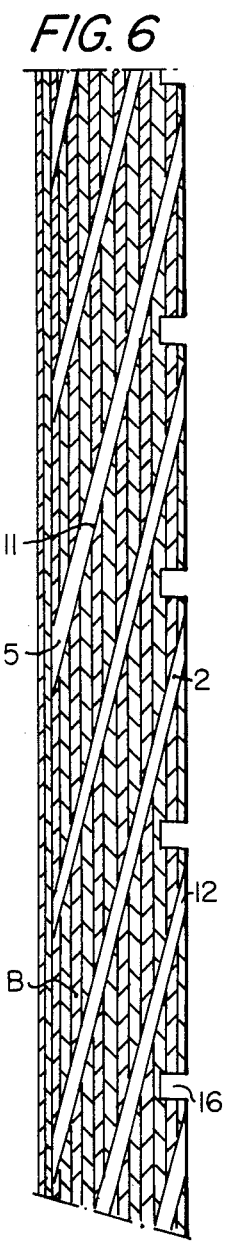
FIG. 6 is a partial developed section through VI—VI of FIG. 5.
Figure 7:
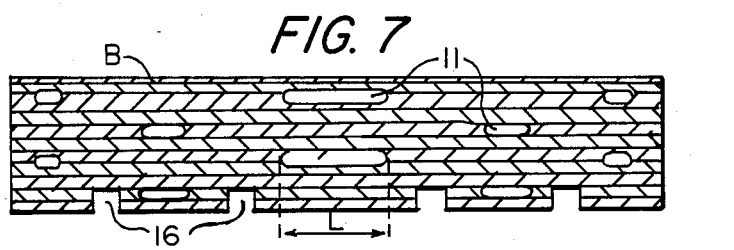
FIG. 7 is a cross section of the running strip.
Figure 8:
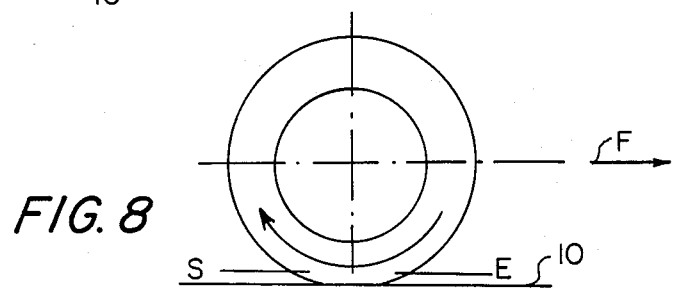
FIG. 8 is a schematical representation of the pneumatic tire and of its rotational direction.

As shown in FIG. 5, the running strip B of the pneumatic tire, which forms the deformable driving belt, comprises passage means 2 passing through this belt and opening, on the inside, at right angles to pockets 5 or similar. The assembly is such that a suction phenomenon increasing the grip is created in a deformation zone S (FIG. 8) of the running strip in contact with the bearing surface formed by the ground 10. This zone S corresponds to the part of the pneumatic tire which leaves the ground, strip B being relieved progressively of the load and pockets 5 resuming their volume and sucking in the air through the passage means 2 formed by the holes.

Figure 9:
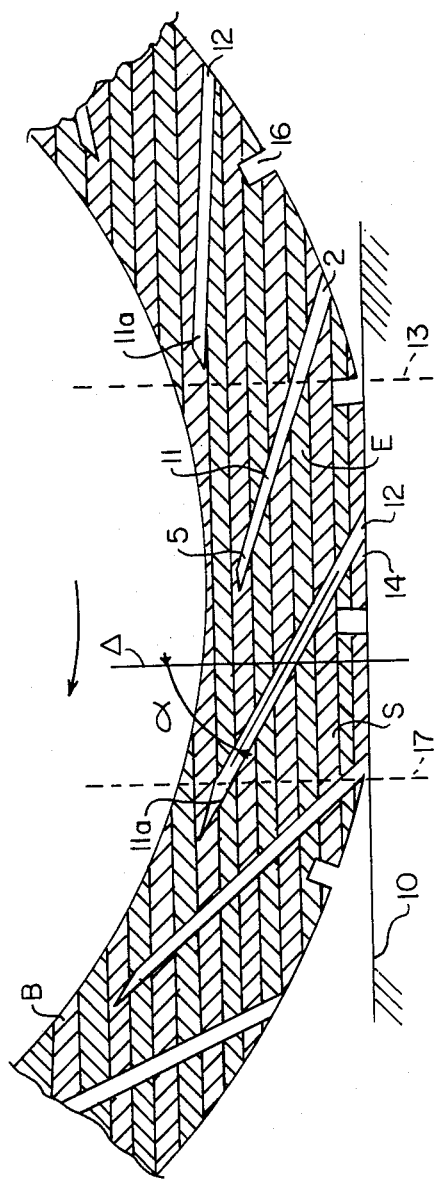
FIG. 9 is a partial section, through the mean longitudinal plane of the pneumatic tire, of the running strip.

Each passage means 2 and pocket 5 which is associated therewith form a blind channel 11 slanting by an angle α with respect to the direction Δ perpendicular to the bearing surface 10, so that there is progressive ejection of air from the channel before the outer end 12 of the channel comes into contact with the bearing surface 10 (see particularly FIG. 9).

When the running strip is not deformed, channel 11 is rectilinear; the part of this channel situated towards the blind end plays the role of pocket 5, whereas the part of channel 11 situated towards end 12 plays the role of passage means 2.

The slant of each channel 11, with respect to direction Δ, is provided so that for the normal direction of movement of the driving band (i.e. in the case of a pneumatic tire for the forward travel direction illustrated by arrow F, with respect to ground 10), the outer end 12 of the channel only comes into contact with the ground 10 after the channel 11 has cleared (see FIG. 9) the beginning 13 of the zone 14 of the tire in contact with the ground 10.

As shown in the drawings, channels 11 are independent from each other and are formed in blocks 15 of the running strip separated by a system of longitudinal and transverse grooves 16.

Advantageously, the slant of channel 11 is such that, when the outer end 12 of the channel comes into contact with the ground 10 (see FIG. 9), the other blind end of channel 11 is situated beyond and outside the limit 17 of contact zone 14. Angle α is preferably equal to or greater than 60°.

The cross section of each blind channel 11 may have a greater dimension L in a direction parallel to the bearing surface 10. It should however be noted that the cross section of channel 11 may have shapes very different from those shown in the drawings and which are substantially rectangular.

The operation of the non slip system follows from the preceding explanations.

The progressive crushing of the running strip B, in zone E (FIG. 8 and 9) of the pneumatic tire which advances in contact with the ground, drives out the air contained in channels 11.

When the outer end 12 of a channel 11 is closed by coming into contact with ground 10, a suction phenomenon is produced by expansion of the part 11a (FIG. 9) of the channel situated outside the bearing surface 14 of the tire.

More precisely, part 11a is situated outwardly of a cylindrical surface with vertical generatrices having the contact surface 14 as basis.

The outer end 12 or orifice of each channel 11 will not tend to choke up because of the ejection of air at the time of crushing.

In the case of high speed, or even when the vehicle is loaded, the efficiency of the system is accentuated during braking by the load transfer which causes a greater crushing effect and so a stronger suction.

FIGS. 10 to 17 show other embodiments.

Figure 10:
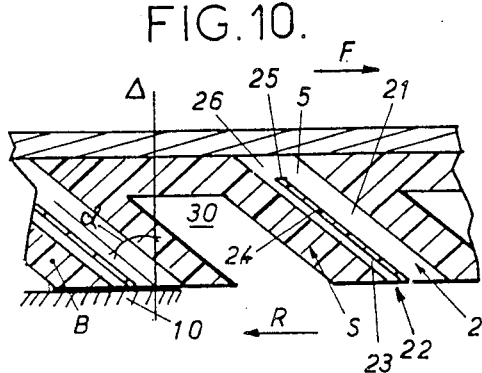
FIG. 10 is a partial longitudinal section of a driving band formed by the running strip of the pneumatic tire provided with the non slip system according to the invention.

As shown in FIG. 10, the running strip B of the pneumatic tire, which forms the deformable driving belt, comprises passage means 2 passing through this strip and opening, on the inside, at right angles to pockets 5 or similar. The assembly is such that a suction phenomenon is created by aspiration, increasing the grip, in a deformation zone S of the strip in contact with the bearing surface formed by ground 10.

Each passage means 2 and the pocket 5 are formed by the combination of a blind channel 21 slanting through an angle α with respect to the direction Δ perpendicular to the bearing surface 10 and means 22 for facilitating detachment of channel 11.

Figure 11:
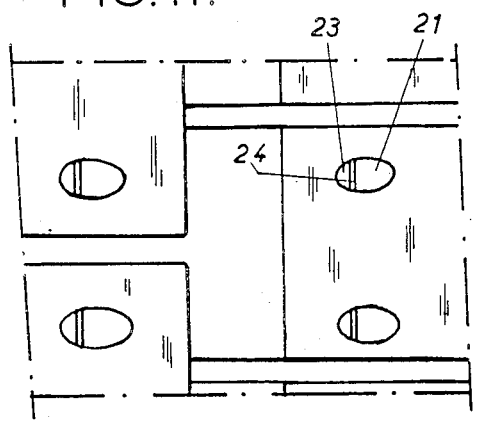
FIG. 11 is a bottom view with respect to FIG. 10.

In the embodiment shown in FIGS. 10 and 11, means 22 comprise an auxiliary channel 23, with reduced cross section, with respect to that of channel 21. This channel 23 is situated, with respect to channel 21, forwardly in the direction of movement or of rotation R of strip B with respect to ground 10. If we take as reference direction the forward travel direction F of the vehicle, channel 23 is situated behind channel 21. In the embodiment shown in FIGS. 10 and 11, a slanting dividing wall 24 separates channel 21 from channel 23, this driving wall 24 being stopped at 25 at a certain distance from the bottom of blind channel 21. Space 26 provides communication between the auxiliary channel 23 and a zone of channel 21 situated towards the blind end of this channel. The dividing wall 24 will then remain until maximum wear of the running strip B.

The operation of means 22 is the following.

At the moment when strip B, in the region of the outer end of channels 21, 22 begins to leave the ground, channel 23 which has a reduced surface leaves the ground first. The force required for detaching the end of channel 23 with reduced section from the ground will be smaller than for a larger section channel. Detachment of channel 23 allows air to enter channel 21 through the communication 26 and so facilitates detachment of this channel 21 with respect to the bearing surface 10. Resistance to travelling will then be reduced.

Figure 12:
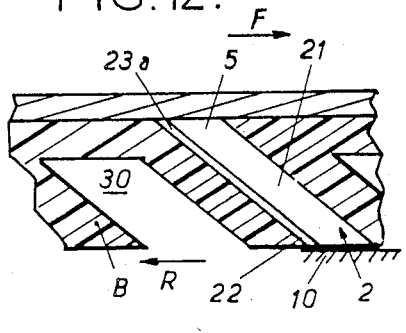
FIG. 12 shows, similarly to FIG. 10, another embodiment.
Figure 13:
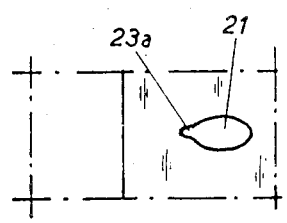
FIG. 13 is a bottom view with respect to FIG. 12.

FIGS. 12 and 13 show a variant in which the auxiliary channel is formed by a groove 23a, having a reduced section with respect to channel 21 and extending over the whole length of this channel. This groove 23a is also situated behind channel 21 in the travel direction F of the vehicle, or in front of this channel if we consider the rotational direction R of the strip at the point of contact thereof with the ground.

Figure 14:
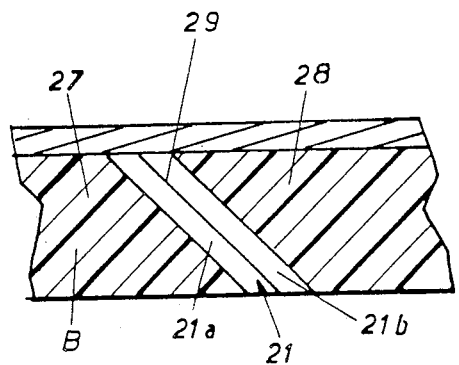
FIG. 14 shows, similarly to FIG. 10, another embodiment.
Figure 15:
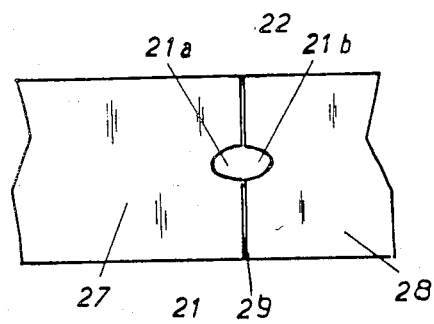
FIG. 15 is a bottom view with respect to FIG 14.

In the variant shown in FIGS. 14 and 15, means 22 are formed by providing channel 21 in two parts 21a, 21b, for example two half channels 21a, 21b with a semi circular section, with their concave sides turned towards each other. These two half channels are provided in two blocks 27, 28 of strip B separated by a slit 29 of zero width. Blocks 27, 28 may be formed by transverse strips. Blocks 27, 28 are jointing during crushing of strip B, i.e. hermetically sealed.

The two half channels 21a, 21b disposed one against the other form again the blind channel 21.

When the region of strip B containing channels 21a, 21b begins to be relieved of the weight of the vehicle, blocks 27, 28 move slightly away from each other while causing slit 29 to reappear which allows air to enter into the channel formed by the assembly 21a, 21b. Detachment of this channel is thus facilitated.

Figure 16:
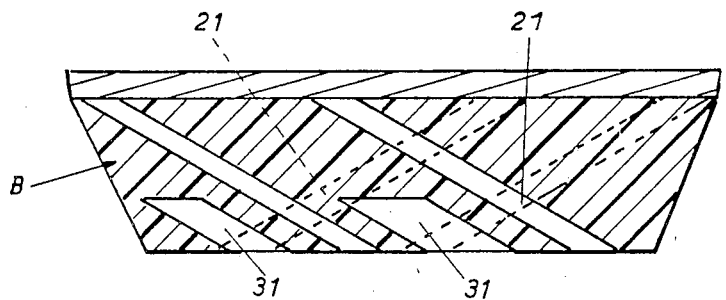
FIG. 16 is a schematical partial cross section of the running strip.

As shown in FIG. 16, channels 21 may be slanted in the left or right transverse direction or in both directions so as to provide better lateral grip in left hand and right hand bends.

Figure 17:
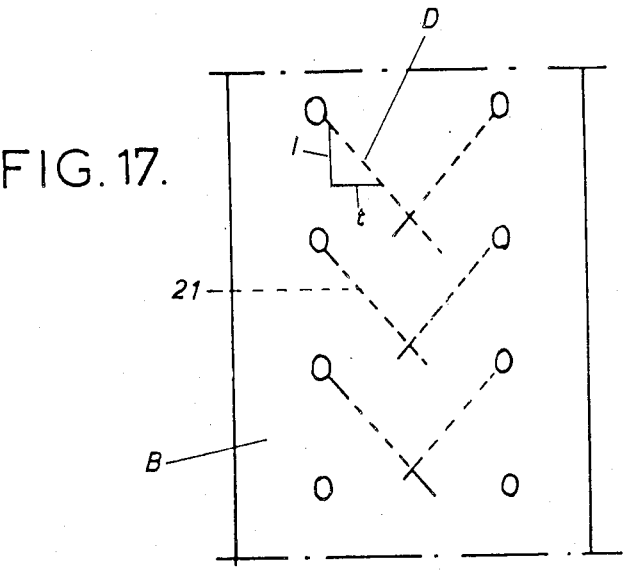
FIG. 17 finally is a partial elevational view of the running strip.

As shown in FIG. 17, channels 21 may be orientated in a direction D having a component t in the transverse direction and 1 in the longitudinal direction.

As can be seen in FIGS. 10 and 12, the transverse tread 30 of the running strip, which allows the removal of water, may be slanted through the same angle as that of channels 21. Removal from the mold is thus facilitated and the grip is more efficient on roads, particularly in the case of snow.

As shown also in FIG. 16, the longitudinal tread 31 of the running strip may be slanted through the same angle as channels 21 orientated in the transverse direction.

This parallelism between the tread and the channels allows the angle of orientation of the channels to be reduced without reducing the depth of the tread. It is also possible to reduce the thickness of the running strip.

It should be noted that the blind end of the channels forms, in a manner of speaking, the pocket 5 which is situated in the running strip B formed from an elastomer material, compressible in the deformable direction or which is crushed under the effect of a load.

The slant angle $\alpha$ of the channels is less than or equal to 90°, on one side or other of direction $\Delta$.

The non slip system of the invention improves the grip as well as road holding. Driving is then safer; the driver has greater steering control more especially in bends. Comfort is improved by a flexibility and suppleness of the pocket structure.

The braking distances are reduced.

I claim:

1. A non slip system for a deformable driving band having a bearing surface comprising passage means passing through the driving band, said passage means comrising channels having an outer open end at said bearing surface, said channels being slanted with respect to a direction perpendicular to said bearing surface, each channel comprising two channel parts having concave sides turned towards each other, said two channel parts being provided in two transverse blocks of material separated by a slit, said slit providing sealing of the blocks during crushing of the driving band, and moving slightly away from each other during decompression of the band.

2. A non slip system according to claim 1 in which the slit has a zero width.

3. A non slip system according to claim 1 in which said channels open, towards the inside, into pockets provided in a compressible strip extending along the whole driving band.

4. A non slip system according to claim 3 in which each channel and the pocket which is associated therewith form a blind channel slanting with respect to a direction perpendicular to the bearing of said surface of said band so that there is progressive ejection of the air from the channel, before the outer end of a channel enters into contact with a surface, this ejection phase being followed by a suction phase.

5. A non slip system according to claim 4 wherein the slant of each channel is provided so that for the normal direction of movement of the driving band with respect to a surface with which the driving band comes in contact, the outer open end of the channel only comes into contact with said surface after the channel has cleared the beginning of the contact zone with said surface.

6. A non slip system according to claim 5 wherein the slant of the channel is such that when the outer open end of the channel comes into contact with said surface, the inner end of the channel is situated beyond and outside the limit of the contact zone with said surface.

7. A non slip system according to claim 1 wherein the cross section of each of the said channels has its larger dimension in a direction parallel to said bearing surface.

8. A non slip system according to claim 1 wherein said channels comprise blind channels from which air is ejected during crushing of the band and into which air is sucked during decompression of the band.

9. A non slip system according to claim 1, in which the channels are slanted in transverse direction.

10. A non slip system according to claim 1 in which the channels are oriented in a direction having a component in the transverse direction and a component in the longitudinal direction.

11. A non slip system according to claim 9 in which the drive band has a tread, said tread of the drive band having grooves slanted in transverse direction through the same angle as the channels.

12. A non slip system according to claim 1 wherein said deformable driving band comprises a pneumatic tire for vehicles, said tire including a casing and a runing strip wherein each channel is situated entirely in the running strip which is situated radially on the outside of the casing.

13. A non slip system according to claim 1 in which the channel is provided in two half channels with a semi-circular section.

* * * * *